Jan. 19, 1932. P. W. SULLIVAN 1,842,214
VEHICLE BODY
Filed March 30, 1929
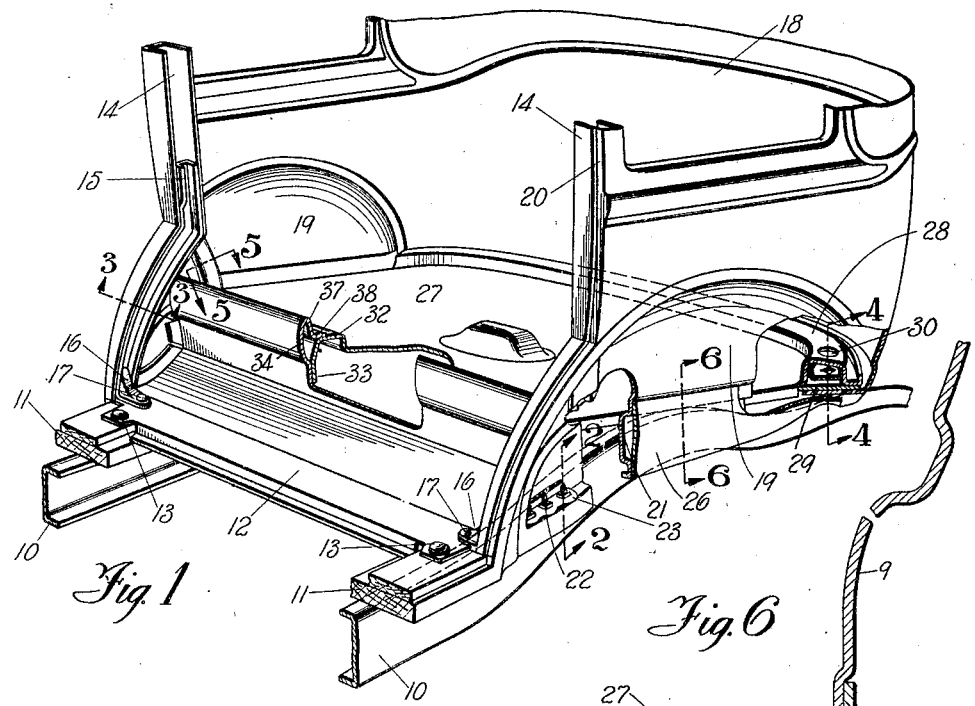
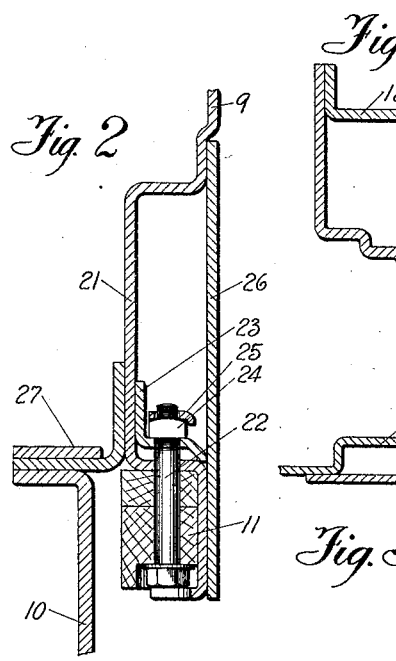
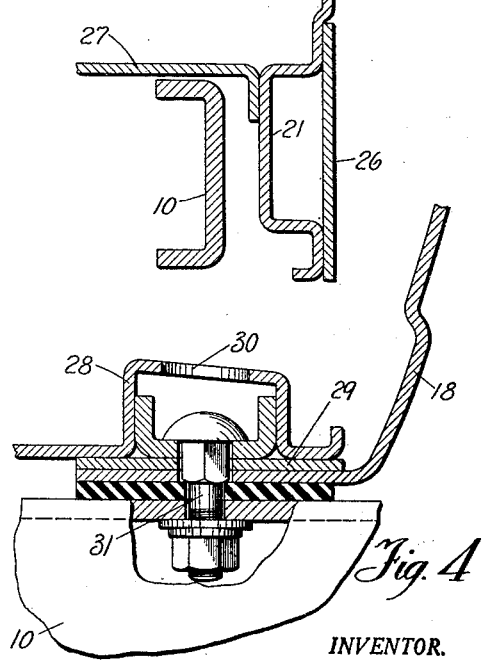
INVENTOR.
BY Perry W. Sullivan
ATTORNEY Patented Jan. 19, 1932

1,842,214

UNITED STATES PATENT OFFICE

PERRY W. SULLIVAN, OF SOUTH BEND, INDIANA, ASSIGNOR TO THE STUDEBAKER CORPORATION, OF SOUTH BEND, INDIANA, A CORPORATION OF NEW JERSEY

VEHICLE BODY

Application filed March 30, 1929. Serial No. 351,184.

This invention relates to automobile bodies and particularly to the rear section thereof, the principal object being to provide such a section fabricated from sheet metal whereby the panel covering and the wheel housing are formed as an integral part, the same being reinforced to provide a strong light structure which can be economically produced in quantities.

Another object is to provide a rear section for an automobile body in which the wheel housings are connected with the seat pan secured thereto for reinforcing the same.

Another object is to provide a wheel housing having a portion thereof recessed to receive the securing bolts and having a plate substantially flush with its outer face for concealing the recessed portion and bolts.

Another object is to provide a wheel housing forming a part of the body panel which constitutes an extension of the body sills and forms the sole support for the rear frame section of the body.

The above being among the objects of the present invention the same consists of certain features of construction and combinations of parts to be hereinafter described with reference to the accompanying drawings and then claimed having the above and other objects in view.

In the accompanying drawings which show a suitable embodiment of the present invention and in which like numerals refer to like parts throughout the several different views, Figure 1 is a fragmentary perspective view of the rear body section, certain parts being broken away and in section to more clearly show the present invention.

Figure 2 is an enlarged sectional view taken on the line 2—2 of Figure 1, showing the means for securing the wheel house to the body sill.

Figure 3 is a section taken on the line 3—3 of Figure 1, showing the body pillar and the reinforcement therefor.

Figure 4 is an enlarged sectional view taken on the line 4—4 of Figure 1, showing the securing means for the wheel house and the seat pan to the frame side members.

Figure 5 is a sectional view taken on the line 5—5 of Figure 1, showing a depression formed in the wheel house for reinforcing the same and the cover plate therefor.

Figure 6 is an enlarged sectional view taken on the line 6—6 of Figure 1, showing a portion of the wheel house, the seat pan secured thereto, and the cover for the depressed portion of the wheel house.

Referring to Figure 1, I have shown a rear section of an automobile body adapted to be supported by the chassis frame side members 10, the same having the usual "kick-up" over the rear axle and extending rearwardly of the body to receive the springs (not shown) as in the usual constructions. The body comprises a pair of sills 11 suitably connected with a kick plate 12 secured thereto by means of the bolts 13 and having channel shaped door pillars 14 in which are positioned reinforcing members 15 terminating in brackets 16 at the lower ends to provide attaching means for securing the same to the sills 11 by means of the bolts 17. The frame work of the body is covered with a sheet metal panel member 18 depressed in each side to form wheel housings 19. The panel member 18 has its forward edges bent over at 20 and welded or otherwise secured to the door pillars 14. The metal of the panel 18 in the region of the wheel housing 19 is depressed at 21 to form a longitudinally extending channel as is clearly shown in Figures 2 and 6. The wheel housing 19 at its forward end is secured to the rearwardly extending portion of the body sills 11 by means of the bolts 22 which extend through the body sill and into the channel portion heretofore described. A plate 23 is preferably welded in the channel to form a reinforcement therefor and to receive the nuts 24 for the bolts 22, the same being held against rotation by means of the clips as shown in Figure 2.

The channel formed in the wheel housing 19 is covered with a plate 26 welded or otherwise secured to the face of the wheel housing 19 as shown in Figures 2 and 6 so that the bolts are concealed and the outer face of the wheel housing presents an unbroken contour and also forms a box section which provides a very strong and rigid construction and which in effect constitutes the rear portion of the body sill.

Extending between the wheel housings 19 is a seat pan 27 having its side edges flanged at 28 whereby the pan is welded or otherwise secured to the wheel housings 19 as shown in Figure 6 so that when assembled the panel 18 with its wheel housings 19 and the seat pan 27 form an integral construction. The seat pan 27 has a raised channel 28 at its rear edge as shown in Figures 1 and 4, the open face of which is covered with a plate 29 to form a box section and reinforcement means for the seat pan and therefore provides a rigid reinforcement for the body at the rear thereof. The raised channel 28 has openings 30 therein through which bolts 31 can be inserted, the bolts extending through suitable openings in the plate 29, the panel 18 and the frame side members 10 for securing the body to the frame side members at that point. The seat pan is raised at 32 along its front edge and terminates in an outwardly extending portion 33 to provide a ledge to which the upwardly extending portion 34 of the kick plate 12 is adapted to be welded or otherwise secured as is clearly shown in the broken out portion of Figure 1. The vertical portion 34 of the kick plate 12 is looped over at 37 and terminates in a horizontal flange 38 whereby the same can be welded to the portion 32 of the seat pan 27 and also provide a retaining strip for holding the cushion (not shown) against sliding out of position.

The wheel housings 19 are also provided with depressed channel portions 35 as shown in Figures 1 and 5 extending beneath the door pillars 14 for reinforcing the same at that point, the depressed channels 35 being covered with the plate 36 to provide a smooth and unbroken outer surface and also to provide a substantially vertical box section as a further reinforcing means for the body.

In the structure heretofore defined the panel 18 and the wheel housings 19 are preferably formed from a single piece of sheet metal whereby all seams, joints and welding are eliminated and in which the metal is deformed to provide reinforcement therefor so that the panel structure forms the support for the rear frame of the body and in which the body sills are eliminated under that portion of the body.

From the foregoing description, the construction and method of assembly should be readily understood and it is apparent that formal changes may be made in the specific embodiment of the invention described without departing from the spirit and substance of the invention, the scope of which is commensurate with the appended claims.

What I claim is:

1. In an automobile body construction, a sheet metal panel having wheel housings formed in the opposite sides thereof, the wheel housings being provided with depressed channel portions forming reinforcements therefor, and cover plates for said channels substantially flush with the outer face of said wheel housing.

2. In an automobile body construction, a sheet metal panel formed with wheel housings in the opposed faces thereof, said wheel housings having depressed channels formed therein, a seat pan secured to said depressed portions of said wheel housings, and cover plates for said depressions in said wheel housings.

3. In an automobile body construction, a sheet metal panel provided with wheel housings formed in the opposed faces thereof, channels formed in said wheel housings, a seat pan extending transversely of said body secured to said wheel housings, a cover plate for said channels in said wheel housings, and means in said channels for securing said wheel housing to the body sills of said automobile.

4. In an automobile body construction, a sheet metal panel formed with wheel housings in the opposed sides thereof, longitudinally extending channels formed in said wheel housings, a cover for said channels, and vertical channels formed in said wheel housing, a cover for said vertical channels, all of said covers being substantially flush with the outer face of said wheel housings to present an unbroken contour of the same.

5. In an automobile body construction supported on a chassis, a sheet metal panel provided with wheel housings formed in the opposed faces thereof, a seat pan extending transversely of said body and secured to said wheel housings, said seat pan having a raised channel portion adjacent to the rear edge thereof, and means positioned in said channel for securing said seat pan and panel to the chassis frame members of said automobile.

Signed at South Bend, Indiana, this 27th day of March, 1929.

PERRY W. SULLIVAN.